Nov. 28, 1933.　　　J. L. PERKINS　　　1,936,731
MACHINE TOOL
Original Filed Oct. 21, 1930　　3 Sheets-Sheet 1

INVENTOR.
Julian L. Perkins
BY Walter C. Ross
ATTORNEY.

Nov. 28, 1933.   J. L. PERKINS   1,936,731
MACHINE TOOL
Original Filed Oct. 21, 1930   3 Sheets-Sheet 2

INVENTOR.
BY Julian L. Perkins
Walter C. Ross
ATTORNEY.

Nov. 28, 1933.   J. L. PERKINS   1,936,731
MACHINE TOOL
Original Filed Oct. 21, 1930   3 Sheets-Sheet 3
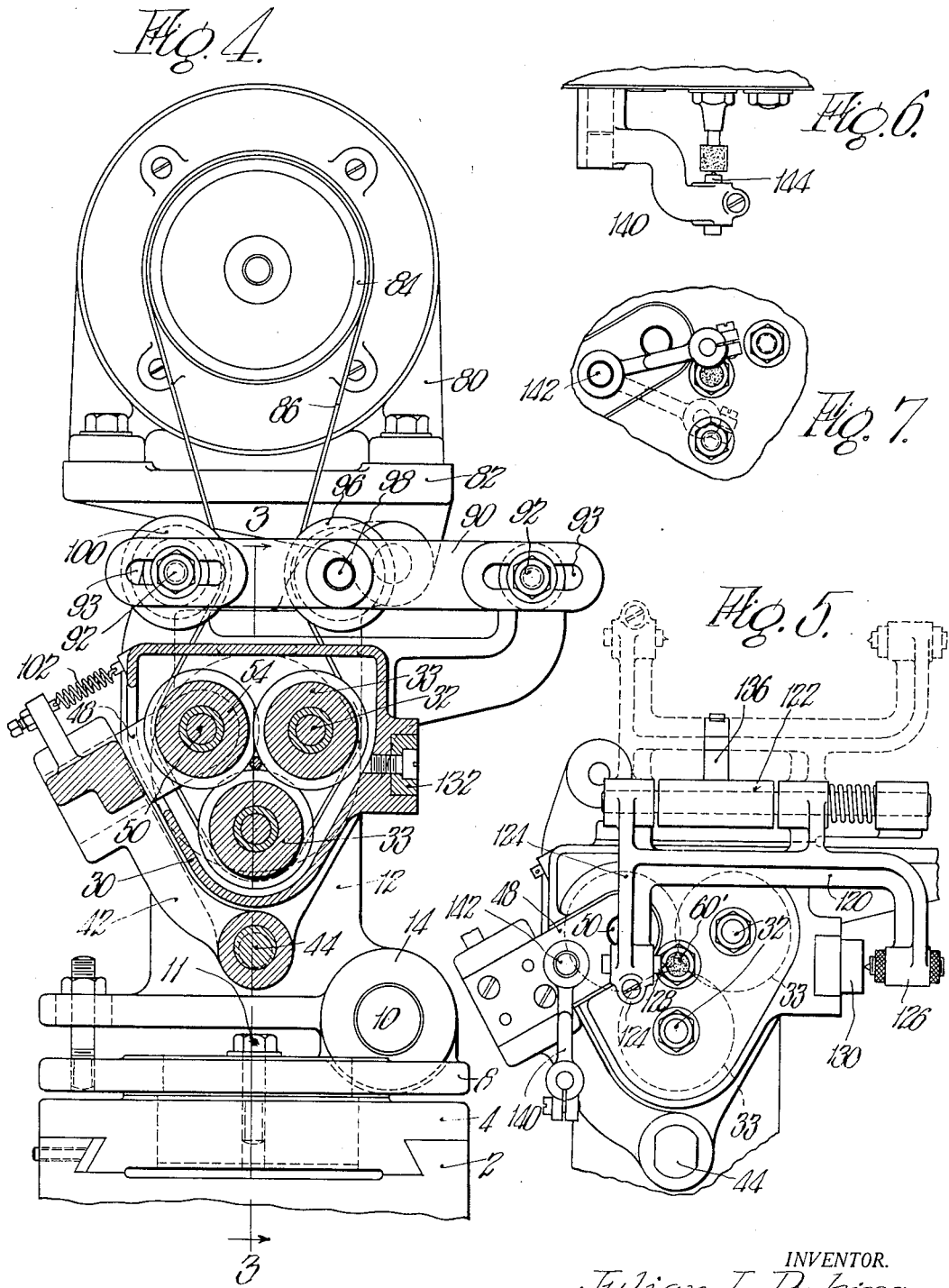
INVENTOR.
Julian L. Perkins.
BY
Walter C Ross
ATTORNEY.

Patented Nov. 28, 1933

1,936,731

UNITED STATES PATENT OFFICE 1,936,731

MACHINE TOOL

Julian L. Perkins, West Springfield, Mass., assignor to Perkins Machine & Gear Company, West Springfield, Mass., a corporation of Massachusetts Application October 21, 1930, Serial No. 490,158
Renewed July 27, 1933

4 Claims. (Cl. 51—166)

This invention relates to improvements in machine tools and is directed more particularly to apparatus adapted for high speed operation.

According to one object of the invention I provide a high speed machine tool apparatus having a rotatable element which by reason of the novel construction and arrangement is adapted for operation at high speeds so that a tool of some sort may be driven at high speeds or a piece of work may be rotated at high speeds for contacting with a tool.

According to another feature of the preferred form of the invention the apparatus embodying the novel features thereof is adapted for use on or in connection with a milling machine or the like. The apparatus according to another feature is so constructed that it may be placed on a machine of the class referred to and has a rotatable arbor or spindle for carrying a tool or a piece of work which spindle is rotated at high speeds for contacting the tool or work carried thereby with work or a spindle carried by the said machine.

According to a special object of the invention I provide a machine tool apparatus which is compact in form and simple in construction so as to be economical to manufacture and efficient in its operation.

According to a further feature of the invention I provide in a machine of the class referred to a rotatable spindle element supported entirely by the driving members therefor, whereby as distinguished from machines wherein the spindle is mounted in bearings, I not only avoid friction between the parts, but maintain the alignment of the spindle by the driving members, all to the end that the spindle may be rotated on a true axis at very high speeds.

The invention is hereinafter described in connection with apparatus wherein a spindle is rotated at high speed by the driving members which support it. The novel features of the invention, however, may be used in connection with electrical apparatus or the like in which case the spindle may represent the armature shaft of a motor so as to be supported and driven by the driving members and in that way obviate the bearings usually employed in a motor.

Numerous and various other novel features and advantages of the invention will be hereinafter more fully referred to in the following description of the invention which in the form at present preferred is illustrated in the accompanying drawings, wherein:

Fig. 4 is a sectional and elevational view on the line 4—4 of Fig. 1.

Fig. 5 is a front elevational view taken on the line 5—5 of Fig. 1.

Fig. 6 is a plan view showing mechanism for dressing the end of a tool carried by the spindle of the machine, and Fig. 7 is a fragmentary front elevational view of the same.

Figure 1:
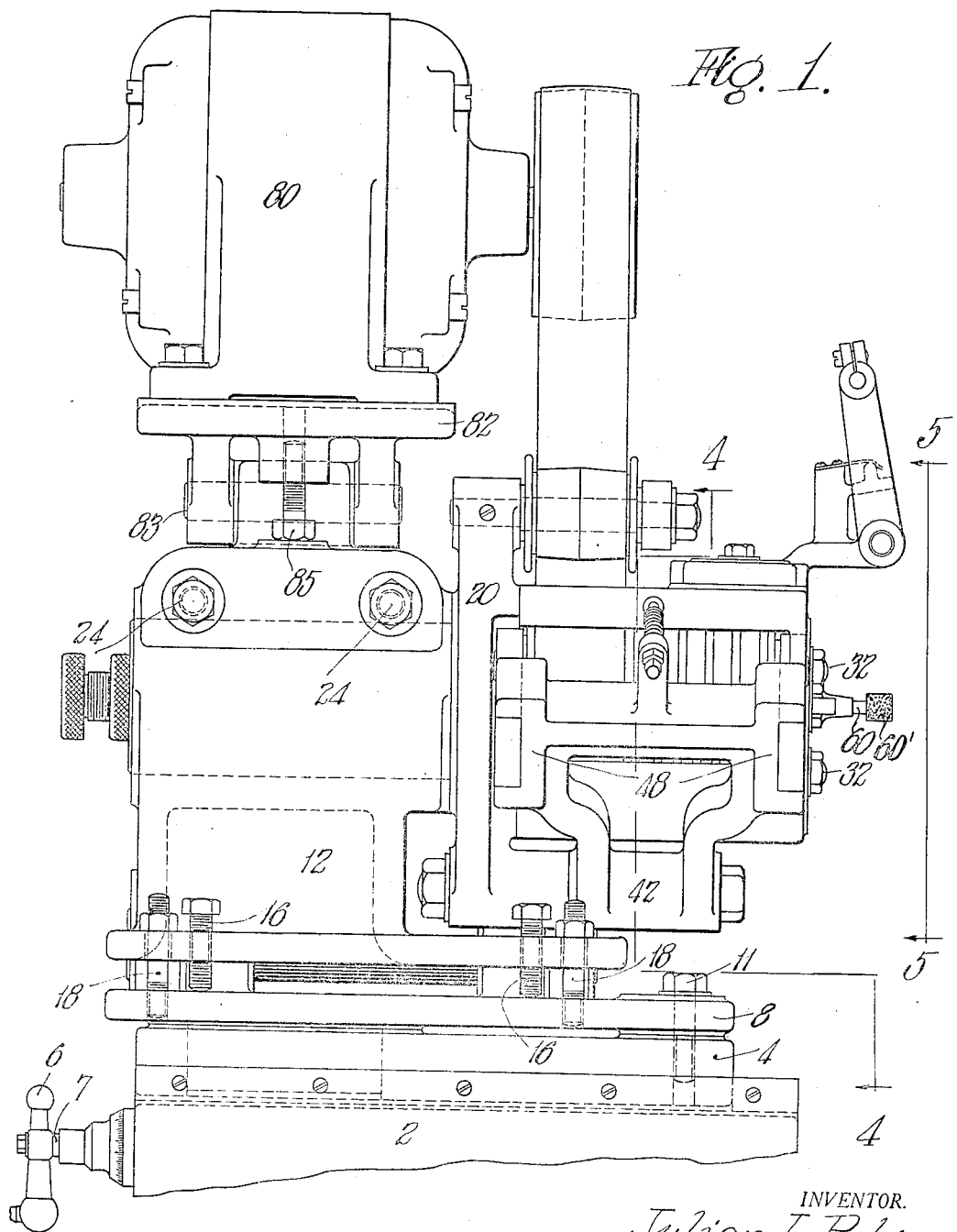
Fig. 1 is a side elevational view of an apparatus embodying the novel features of the invention.
Figure 2:
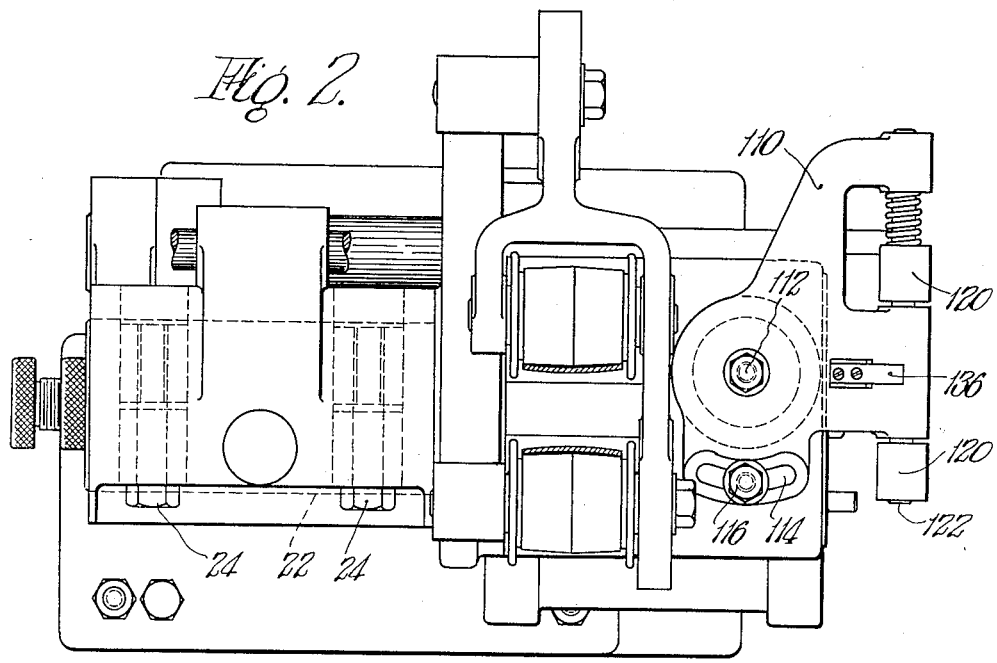
Fig. 2 is a plan view of the same with the motor driver removed therefrom.

Referring now to the drawings more in detail, the invention will be described.

A bed plate is shown at 2 which may represent a bed plate of some machine tool such as a milling machine or the like, or it may well represent a part of the apparatus of the invention. With the bed plate 2 as representing a part of a milling machine or having other machine tool having a movable work or tool carrier, the apparatus of the invention may be supported by the said bed. In such a case a tool or work carried by the spindle of this apparatus may be contacted with a piece of work or a tool which is supported by such a milling machine or the like, as will appear.

A slide 4 is reciprocable back and forth in the bed plate 2 and a hand wheel 6 is shown in Fig. 1 as being on the end of a screw 7 which may be provided to move the slide back and forth along the bed plate 2. This is to facilitate moving the apparatus with respect to the work or tool carried and supported by the machine of which the bed plate may be a part.

A supporting plate 8 is located above the slide 4 and is preferably arranged thereon for shifting movements angularly or otherwise into various positions of adjustment. In some desired adjusted positions the plate is clamped securely to the slide. One form of adjustment may be a hub 9 rotatable in the slide 4 and a clamp bolt or bolts 11 is provided.

A base 12 is provided which is pivoted for swinging movements on an axle 10 carried in bosses or lugs 14 of the supporting plate 8. Adjusting screws 16 threaded in the base bear on the upper side of the supporting plate 8 so that as they are turned in one direction or the other the base will be swung on the axle 10 up and down and towards and away from the supporting plate 8. Clamp bolts 18 have their lower ends threaded in the plate 8 and pass through the base plate. Nuts on the upper ends of the clamp bolts are employed to bear on the base and force the adjusting screws 16 firmly against the plate 8. As will be seen the base may be swung up and down and held in various positions of angular adjustment with respect to the supporting plate and slide.

Figure 3:
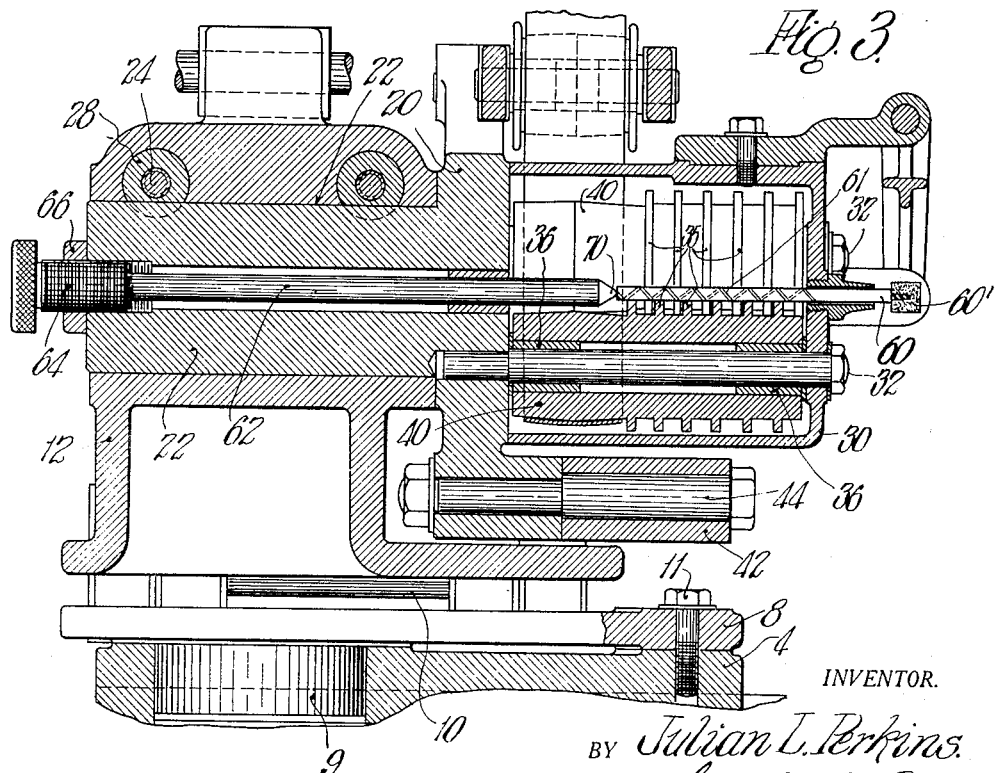
Fig. 3 is a sectional elevational view on the line 3—3 of Fig. 4.

A supporting frame 20 has a cylindrical part 22 extending rearwardly therefrom which is journalled in the base (see Fig. 3.) It is journalled in the base for purposes of adjustment and is held in clamped relation in the base by means of adjusting bolts 24 screw-threaded in one of a pair of clamp members 28 located in suitable apertures in the base and bearing on a side of the part 22. By loosening the bolts 24 the frame 20 may be turned or moved for adjustment in the base after which it may be clamped in place by means of the bolts and clamps. A hollow casing 30 extends forwardly from the frame 20 and may be held thereon by studs or shafts 32 which have their opposite ends in the frame 20 and casing 30 respectively.

Spindle supporting and driving members 33 are rotatable in bushings 36 carried by these studs 32. These members 33 preferably comprise main body portions having spaced annular rings 35 at the forward ends thereof and pulley portions 40 at the rear ends thereon. An arm 42 is mounted for swinging movements on an eccentric stud 44 extending forwardly of the base below the case 36 and has at the upper end thereof spaced bearing portions 48 which carry a stud 50 therebetween which is similar to the studs 32. On this stud is mounted a roll member 54 similar to members 33. A spring 102 is connected at opposite ends to the casing and to the upper end of lever 42 and urges the lever upwardly and inwardly on the spindle 60.

The spaced rings of the driver members 33 and 54 are so arranged that the rings of one member are in a staggered relation with respect to the rings of the other member, so that the peripheries of the rings of one member extend past the peripheries of the rings of the other member so as to lie within the spaces between the rings. In this way the peripheries of the rings do not interfere and they may support and frictionally engage an arbor or spindle 60 of very small diameter, as is best shown in Figs. 1 and 3. This spindle or arbor may carry a tool 61 such as an abrasive wheel or it may well be arranged to carry a piece of work as may be desired. If desired, the ring members and spindle may be provided with intermeshing parts such as gears so that the parts are positively connected.

A spindle adjusting rod 62 has an outer end 64 in screw threaded engagement with the frame and it extends through the hub so that its forward end may bear against the rear end of the spindle 60. By turning the rod in one way or the other, it is moved forward or back to move the spindle forward or back with respect to the driving members. A nut 66 on the screw portion 64 is employed to hold the rod in adjusted position. A shaft 82 is pivoted at 83 at the upper side of the base and has a bolt 85 threaded therein which bears on the upper side of the base. By turning the bolt 85 the shelf may be raised or lowered.

A motor 80 is supported on the shelf 82 and a pulley 84 thereof receives an endless belt 86 which passes downwardly and over the pulley portions of the spindle driving members. An adjusting bar 90 movable on the frame is held in various positions of adjustment by means of bolts 92 in slots 93 thereof as shown. A pulley 96 is rotatable on a stud 98 of the bar 90 and bears on one side of the belt 86. Another pulley 100 is rotatable on one of the bolts 92 and engages the other side of the belt. As the bar is shifted in one direction or the other the belt may be tensioned by the pulleys and by tilting the shelf up or down the tension of the belt is altered.

As the motor is operated to rotate and drive the endless belt the driving members are rotated so that the rings support and frictionally engage to rotate the spindle 60 at high speed. By providing the rings on the driving members so that they intermesh or interleave as they do, it is possible to employ a spindle of relatively small diameter as compared with the relatively greater diameter of the driving members. In this way the spindle may be driven at extremely high speeds which is especially desirable where the spindle is used for rotating a small abrasive tool or a small piece of work.

Various means may be employed for urging the spindle rearwardly or inwardly against the adjusting rod 62. According to one form of the invention it is desired to provide the spindle with a spiral groove or grooves or a spiral ridge or ridges 60, so that in its rotative movements the rings of the drivers act on the spiral so that the natural tendency of the spindle is to move rearwardly against the endwise adjusting bolt 62. In another way the axes of driving members may be angularly disposed relative to one another to a slight degree so that the spindle is urged rearwardly.

It will be readily appreciated that by merely swinging the lever 42 downwardly that the spindle is released so that it may be withdrawn from between the driving members and is as easily replaced. It will also be observed that the spindle is supported entirely by and between these driving members which serve to drive it as well. In this way the frictional action between the driving rollers and spindle is not sufficient to be objectionable but is adequate for the desired high speed operation of the spindle. This is to be distinguished from a spindle mounted in bearings where frictional action unfavorably effects the speed at which the spindle may operate.

By turning the stud 44 in one direction or the other the axis for the swinging movements of the lever 42 may be varied so that the driving member carried by the lever is raised or lowered with respect to the driving members mounted in the casing.

Means for dressing or working on a tool carried by the spindle is provided and will now be described in detail.

A bracket 110 is pivotally mounted at the upper side of the case for swinging movements on a stud 112. This bracket is provided with a slot 114 which receives a clamp screw 116 in threaded engagement with the case. This screw 116 may be utilized to clamp the bracket in various positions of angular adjustment. A member 120 is mounted on a shaft 122 carried by the bracket for swinging movements and has depending and spaced arms 124 and 126. A dressing tool 128 is adjustable in the arm 124 and may take the form of a diamond point for engaging the side face of the tool 60 on the end of the spindle. A cam plate 130 may be secured to a side of the casing against which an adjusting screw 131 in the arm 126 may ride. Preferably the dressing tool and plate 130 will be of such form and so arranged that as the member 120 is swung back and forth it will carry the tool 128 across the side face of the tool on the spindle and produce thereon the proper and desired contour. When not in use the arm may be swung to the upper dotted line position shown in Fig. 5 and wherein it will be engaged by and held in this upright position by a spring 136 extendng upwardly from the member 110.

Means for operating on the outer end of the tool 60 may comprise an arm 140 pivoted on arm 42 for swinging movements. A facing tool 144 carried in the outer end of the arm 140 may take the form of a diamond finishing tool for swinging across the face of the tool. By means of the tool 144 it is possible to maintain the forward end of the tool on the spindle in proper cutting condition, and to insure that its cutting surfaces are of the desired contour or shape.

In operation the slide 4 is mounted so that a tool on the spindle 60 may engage and work upon a piece of work which may be either stationary or rotated. It is assumed that the work of course will be suitably positioned with respect to the spindle of the apparatus.

When properly located and when the motor is in operation, the driving members are rotated to rotate the spindle. Their direction of rotation of course is such as will rotate the spindle continuously in the desired direction. By reason of the relatively small spindle employed as compared with the larger driving members the spindle is rotated thereby at a very high speed. For instance, it has been possible to drive the spindle at a speed of from 45 to 50,000 revolutions per minute, while at the same time it is held on a true axis of rotation.

The arm 42 may be swung downwardly so that the spindle may be withdrawn and/or inserted between the driving members and when desired the spindle may be moved forwardly by the adjusting screw 62. When the bolt 62 is retracted the spindle will follow rearwardly and be caused to bear against the end thereof by means of the grooves or ridges or some other suitable means.

The base may be swung up and down and held in various positions relative thereto so as to locate the spindle as may be desired, while the supporting plate may be adjusted on the slide 4 and the frame 20 may be adjusted in the base.

By means of the various adjustments made possible by the novel construction, the spindle may be thereby located as may be desired so that the tool may operate at the desired high speeds on the work.

Various changes may be made in the form of the invention without departing from the spirit and scope thereof and therefore what I desire to claim and secure as broadly as the law permits is:

I claim:

1. A machine of the class described comprising in combination, a base, a frame rotatably adjustable therein, a casing on said frame, rotatable members including pulleys and spaced spindle supporting rings, an arm carrying a rotatable member including a pulley and spindle supporting rings, pivotal connections between said arm and base, means to urge the arm in one direction to yieldingly hold the rotatable member in operative relation with the first-named rotatable members, and a tool spindle rotatably supported by the rings of said rotatable members.

2. A machine of the class described comprising in combination, a base, a frame rotatably adjustable therein, a casing on said frame, rotatable members including pulleys and spaced spindle supporting rings, an arm carrying a rotatable member including a pulley and spindle supporting rings, pivotal connections between said arm and base, means to urge the arm in one direction to yieldingly hold the rotatable member in operative relation with the first-named rotatable members, and a tool spindle rotatably supported by the rings of said rotatable members, the said rings of the rotatable members being arranged in staggered relation for engaging the spindle at different points.

3. A machine of the class described comprising in combination, a base, a frame rotatably adjustable therein, a casing on said frame, rotatable members including pulleys and spaced spindle supporting rings, an arm carrying a rotatable member including a pulley and spindle supporting rings, pivotal connections between said arm and base, means to urge the arm in one direction to yieldingly hold the rotatable member in operative relation with the first-named rotatable members, a tool spindle rotatably supported by the rings of said rotatable members, and a member mounted on an axis transverse to the axes of said rotatable members for carrying a dressing tool into and out of engagement with a part on the outer end of said spindle.

4. A machine of the class described comprising in combination, a base, a frame rotatably adjustable therein, a casing on said frame, rotatable members including pulleys and spaced spindle supporting rings, an arm carrying a rotatable member including a pulley and spindle supporting rings, pivotal connections between said arm and base, means to urge the arm in one direction to yieldingly hold the rotatable member in operative relation with the first-named rotatable members, a tool spindle rotatably supported by the rings of said rotatable members, and a motor adjustably pivoted to said base, driving connections between said motor and the pulleys of said rotatable members and means associated with said connections for tightening the same.

JULIAN L. PERKINS.